June 19, 1956 D. F. WILSON 2,751,184
GATE ATTACHING STRUCTURE FOR CONCRETE PIPE
Filed Sept. 22, 1954 2 Sheets-Sheet 1

Daniel F. Wilson
INVENTOR.

BY
ATTORNEY

June 19, 1956 D. F. WILSON 2,751,184
GATE ATTACHING STRUCTURE FOR CONCRETE PIPE
Filed Sept. 22, 1954 2 Sheets-Sheet 2
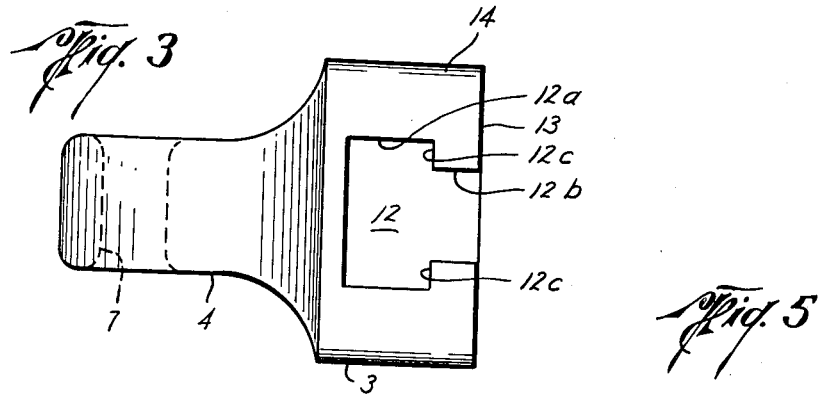
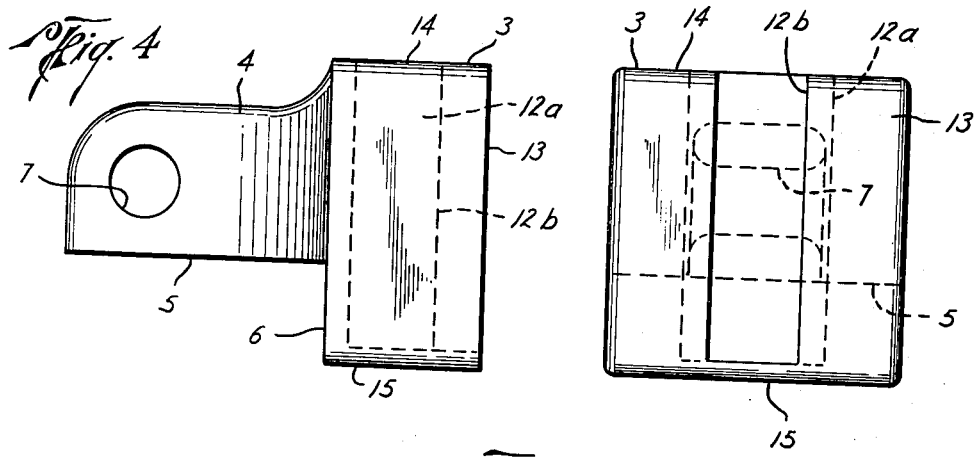
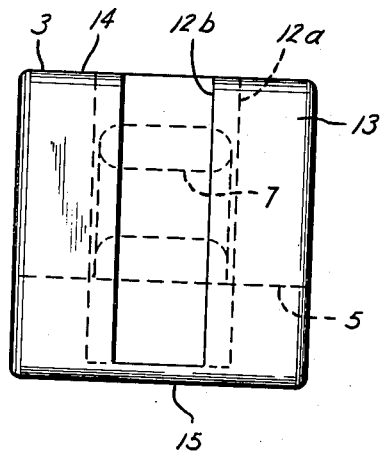
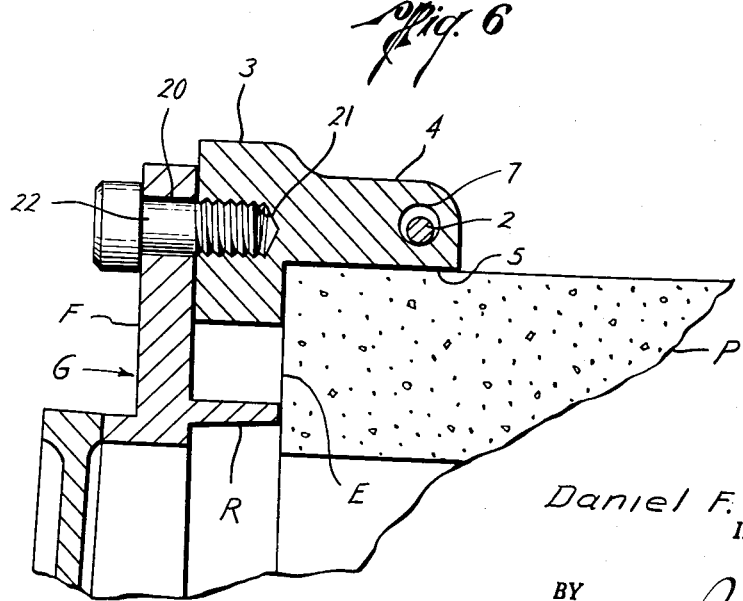
Daniel F. Wilson
INVENTOR.
BY
ATTORNEY

United States Patent Office 2,751,184
Patented June 19, 1956

2,751,184

GATE ATTACHING STRUCTURE FOR CONCRETE PIPE

Daniel F. Wilson, Houston, Tex., assignor to Conflo Engineering & Mfg. Co., a corporation of Texas Application September 22, 1954, Serial No. 457,644

5 Claims. (Cl. 251—147)

This invention relates to water control apparatus, and more particularly to means for attaching various types of water control gates to concrete pipe.

In hydraulic systems handling large volumes of water through large diameter concrete pipe, as in flood control, irrigation, sewage systems, and the like, various types of control gates must frequently be mounted over the ends of such pipes to control the flow of fluid therethrough. These control gates are often relatively massive metallic structures and their secure attachment to concrete pipes has heretofore required special attaching means of relatively expensive and cumbersome construction which is further complicated by the considerable variations which commonly occur in the diameters of conventional concrete pipe, particularly in large diameter sizes.

The present invention, therefore, has for its primary object the provision of a relatively simple and efficient structure by which conventional control gates of various types may be quickly and securely mounted over the ends of concrete pipe with a minimum of effort and expense.

An important object is to provide a mounting structure embodying a plurality of mounting lugs secured in angularly spaced relation about the periphery of a concrete pipe by a common securing member, the lugs providing means to which a control gate may be releasably attached.

A further object is to provide a mounting structure of the class described wherein the lug members include connecting means which are adjustable to accommodate attachment of the control gate frame to pipes of varying diameter.

An additional object is to provide a structure for attaching a control gate to the end of a concrete pipe, said structure including a plurality of attachment lugs disposed in angularly spaced relation about the periphery of the pipe end and clamped securely to the pipe periphery by means of a metallic hoop rod encircling the pipe and passing through openings in the several lugs, the ends of the hoop rod being connected to a fitting by means of which the ends of the hoop rod are drawn toward each other to clamp the lugs to the pipe.

Other and more specific objects and advantages of this invention will become more readily apparent from the following detailed description when read in conjunction with the accompanying drawing which illustrates several useful embodiments in accordance with this invention.

In the drawing:

Figs. 3, 4 and 5 are, respectively, a top plan view, a side elevational view, and a front elevational view of one of the attachment lugs employed in the embodiment of Fig. 1; and Fig. 6 is a fragmentary sectional view, similar to Fig. 2, illustrating a modified form of an attachment lug.

Figure 1:
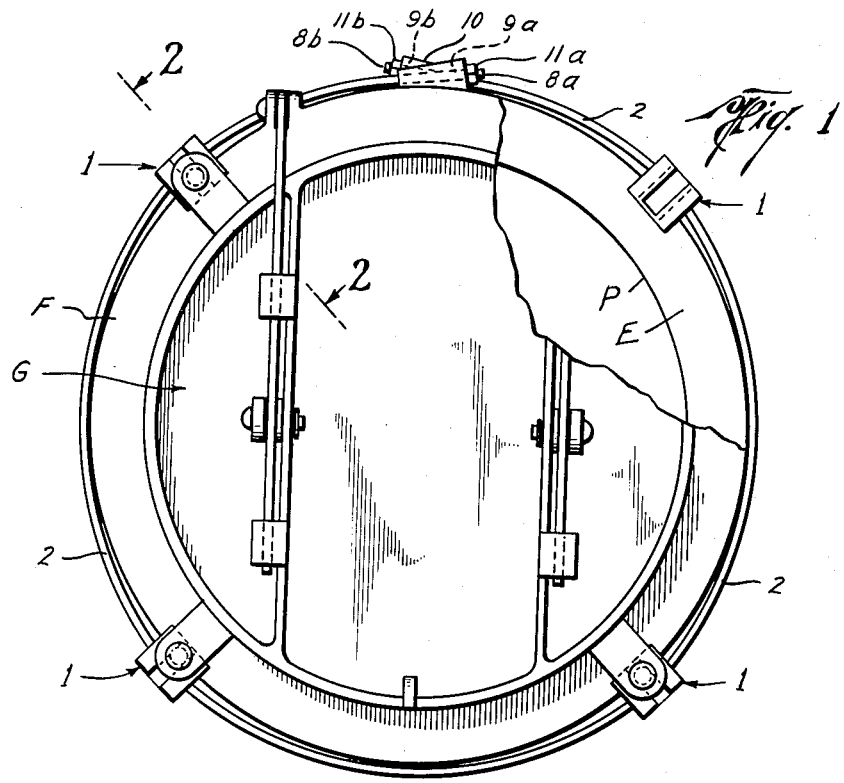
Fig. 1 is a front elevational view of a flap gate, partially broken away, and showing the gate secured to the end of a concrete pipe by the attaching structure in accordance with one embodiment of this invention.
Figure 2:
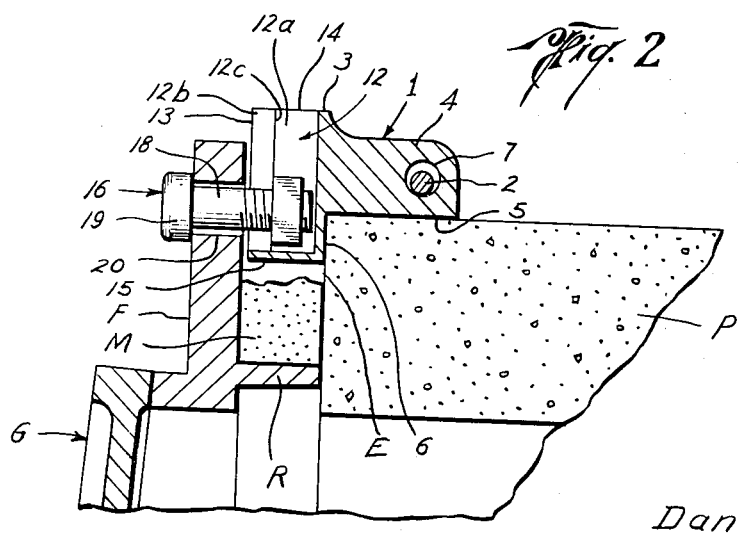
Figure 2 is a fragmentary sectional view taken generally along line 2—2 of Fig. 1.

Referring to the drawing, there is shown the end portion of a concrete pipe P having an end face E over which is mounted a flap-type control gate G of any suitable or well-known design, the gate being secured to the pipe by an attachment structure in accordance with the present invention. The gate illustrated is a conventional flap gate, but may be a sliding or other type gate.

The attachment structure includes a plurality of lug members, each designated generally by the numeral 1, the lug members being disposed in angularly spaced relation about the periphery of the end portion of the pipe and tightly secured thereto by means of a hoop rod 2 in a manner to be subsequently described.

As best seen in Figs. 2 to 5, each of the lug members 1 is constructed of metal, such as cast iron, and comprises a square or generally rectangular head portion 3 and an elongated shank portion 4 integrally formed with the head and projecting rearwardly from the rear face of the head portion. The shank portion is formed with a lower face 5 substantially flat or slightly curved to rest snugly against the outer surface of pipe P, head portion 3 projecting downwardly below lower face 5 to provide a rearwardly facing shoulder 6 adapted to overhang and bear against end face E. Thus when lug member 1 is in position on the end of the pipe, shank portion 4 will extend longitudinally along the outer surface of pipe P rearwardly from shoulder 6 and end face E. Near its rearward end shank portion 4 is transversely pierced by a hole or opening 7, the opening 7 in the several lug members being adapted to receive the generally round hoop rod 2 which is wrapped circumferentially around the exterior of pipe P and passes successively through the openings 7 in the several lug members. The opposite ends 8a and 8b of the hoop rod are threaded and extend in opposite directions through generally parallel bores 9a and 9b provided in a conventional clamp fitting 10, commonly known as a side pull tank lug (Fig. 1) by means of which the ends of hoop rod 2 are drawn toward each other to tighten the hoop rod about the exterior of pipe P and thereby clamp the lug members tightly against the exterior surface of pipe P. Nuts 11a and 11b are screwed on the threaded ends 8a and 8b, respectively, of the hoop rod and when screwed down against the adjacent ends of fitting 10 serve to apply the desired pull on the hoop rod.

Head portions 3 embody the means to which the gate G is directly attached in connecting the gate to the pipe end and for this purpose may include various constructions. In the embodiment illustrated in Figs. 1 to 5, head portion 3 of each lug member is provided with a vertically extending slot 12 which is generally T-shaped in horizontal cross-section, including the head or cross-member 12a and the center leg 12b, the latter opening to the front face 13 of the head portion. The T-shape of the slot provides longitudinally extending rearwardly facing shoulders 12c—12c in the slot on each side of center leg 12b. The upper end of the slot opens to the upper end face 14 of the head portion and the lower end of the slot is closed by an end wall 15.

The T-shaped slot 12 is adapted to receive a conventional square-head nut and bolt, designated generally by the numeral 16, by which the gate G is attached to the lug members. The nut 17 is preferably positioned in the cross-portion 12a of slot 12, the width of cross-portion 12a being made such as to hold the square nut from turning therein while shoulders 12c—12c hold the nut in the slot. The bolt includes the shank 18 and a square head 19, the shank 18 being adapted to pass through leg 12b of the slot and screw into nut 17.

To fasten the gate G to the lug members, the bolts will be inserted through appropriate openings 20 conventionally provided in the frame F of the gate, the bolts being screwed into nuts 17 and thereby drawing the gate frame toward the faces 13 of the lug members. Frame F of the gate will usually be provided with the rearwardly projecting ring flange R which, when the frame is drawn toward the lug members, will be urged tightly against end face E of the pipe and thus seal about the pipe bore. A suitable grouting or sealing material M, such as mortar, may be employed to fill the space about flange R between the opposing faces of frame F and pipe end face E to provide a fluid-tight seal between the gate and the end face of the pipe when the frame has been tightly secured to the lug members.

Since gate G and its frame elements will ordinarily be of standardized form and dimensions and the openings 20 will necessarily be fixed in their position in frame F, slot 12 forms with bolt 16 an adjustable connection which allows the bolts to be adjusted longitudinally of the slots (radially with respect to the pipe axis) to compensate for variations in the diameter of pipe P relative to the fixed dimensions of gate G and its frame elements.

From the foregoing, it will be seen that the gate attaching structure in accordance with this invention may be very quickly and easily applied to any concrete pipe end, the only tools required being wrenches for tightening nuts 8a and 8b to draw hoop rod 2 tightly about the pipe end and for tightening up bolts 16 to fasten the gate to the lug members. Obviously, the gate-attaching structure in accordance with the present invention may also be readily released from the pipe by simple manipulation of wrenches.

It will also be seen that one of the most important features of the present invention resides in the flexibility of the attaching structure in that it may be applied to pipes of widely varying sizes, since the hoop means employed for clamping the lug members to the pipe may obviously be made as long or as short as desired.

It will be understood that the number of lug members employed may be varied, depending principally on the pipe diameter and the number of points of attachment desired for the gate frame.

Fig. 6 illustrates another modification of the lug members which may be employed where variation in the pipe diameters is not a factor in making connection to the gate. In this modification, outer face 13 of the lug members 1 may be provided with drilled and tapped holes 21 adapted to receive a stud bolt 22 which is employed to secure the gate frame F to the lug members. In all other respects the attaching structure is identical with that previously described.

It will be understood that numerous other modifications and alterations may be made in the details of the illustrative embodiments within the scope of the appended claims without departing from the spirit of this invention.

What I claim and desire to secure by Letters Patent is:

1. A structure for attaching a control gate to a concrete pipe, comprising, a plurality of separate lug members adapted to be positioned in angularly spaced relation about the periphery of a concrete pipe adjacent an end thereof, each of said lug members comprising a head portion overhanging an end face of the pipe and having an integral rearwardly extending shank portion seated on the exterior of the pipe, a hoop means surrounding the periphery of the pipe and engaging the shank portions of all said lug members whereby to clamp the lug members against the exterior of the pipe, and connector means carried by said head portions for attachment of a control gate thereto.

2. A structure for attaching a control gate to a concrete pipe, comprising, a plurality of separate lug members adapted to be positioned in angularly spaced relation about the periphery of a concrete pipe adjacent an end thereof, each of said lug members comprising a head portion overhanging an end face of the pipe and having an integral rearwardly extending shank portion seated on the exterior of the pipe, a hoop means surrounding the periphery of the pipe and engaging the shank portions of all said lug members whereby to clamp the lug members against the exterior of the pipe, and connector means carried by said head portions adjustable therein radially with respect to the pipe axis for connecting a control gate to said lug members.

3. A structure according to claim 2 wherein said connector means includes a T-shaped slot opening to the forward face and upper end of the head portion, and a square head bolt and nut mounted to slide longitudinally in said slot.

4. A structure according to claim 2 wherein said connector means includes a drilled and tapped hole in the forward face of the head portion, and a stud threadedly insertible in said hole.

5. A structure for attaching a control gate to a concrete pipe, comprising, a plurality of separate lug members adapted to be positioned in angularly spaced relation about the periphery of a concrete pipe adjacent an end thereof, each of said lug members comprising a head portion overhanging an end face of the pipe and having an integral rearwardly extending shank portion seated against the exterior of the pipe, the shank portion of each lug member having a transverse opening therethrough, a metallic hoop rod surrounding the periphery of the pipe and passing through the openings in the shank portions of the several lug members, means for drawing the ends of hoop rod toward each other whereby to clamp the lug members tightly against the exterior of the pipe, and connector means carried by said head portions for attachment of a control gate thereto.

References Cited in the file of this patent

UNITED STATES PATENTS

| | | |
|---|---|---|
| 811,212 | Giddings | Jan. 30, 1906 |
| 940,098 | Wehrle | Nov. 16, 1909 |
| 976,720 | Buttorff | Nov. 22, 1910 |
| 1,571,870 | Peterson | Feb. 2, 1926 |
| 1,951,034 | Norton | Mar. 13, 1934 |